(12) United States Patent
Lynch

(10) Patent No.: US 8,530,040 B2
(45) Date of Patent: *Sep. 10, 2013

(54) NESTABLE MOLDED ARTICLES, AND RELATED ASSEMBLIES AND METHODS

(71) Applicant: Masonite Corporation, Tampa, FL (US)

(72) Inventor: Steven K. Lynch, St. Charles, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,688

(22) Filed: Oct. 9, 2012

(65) Prior Publication Data

US 2013/0034704 A1  Feb. 7, 2013

Related U.S. Application Data

(60) Continuation of application No. 13/295,180, filed on Nov. 14, 2011, now Pat. No. 8,283,022, which is a continuation of application No. 13/029,180, filed on Feb. 17, 2011, now Pat. No. 8,147,947, which is a division of application No. 12/112,117, filed on Apr. 30, 2008, now Pat. No. 7,897,246.

(60) Provisional application No. 60/924,128, filed on May 1, 2007.

(51) Int. Cl.
B32B 3/00 (2006.01)
E06B 3/70 (2006.01)

(52) U.S. Cl.
USPC .............. 428/174; 428/156; 428/161; 52/455

(58) Field of Classification Search
USPC ............ 428/174, 156, 171, 172, 161; 52/455
See application file for complete search history.

(56) References Cited

U.S. PATENT DOCUMENTS

| 7,897,246 B2 * | 3/2011 | Lynch | 428/174 |
| 8,147,947 B2 * | 4/2012 | Lynch | 428/174 |
| 8,283,022 B2 * | 10/2012 | Lynch | 428/174 |

\* cited by examiner

Primary Examiner — Catherine A Simone
(74) Attorney, Agent, or Firm — Berenato & White, LLC

(57) ABSTRACT

A man-made, molded article is provided. The article includes a profile including a planar wall, and an adjacent integral molded depression having a contoured wall extending downwardly from the planar wall. The contoured wall includes a bead portion, a cove portion, and a ledge between the bead and cove portions. The articles are stackable, one above another for transport, in a nestable relationship in which multiple contact zones are present between the contoured walls of an adjacently stacked pair of the molded articles. The contact zones include an arcuately extending contact interface zone between the bead exterior and interior surfaces. The depression has a substantially uniform thickness varying by no more than about +1 percent to about −11 percent in relation to a thickness of the planar wall. Related methods and assemblies are also provided.

20 Claims, 10 Drawing Sheets

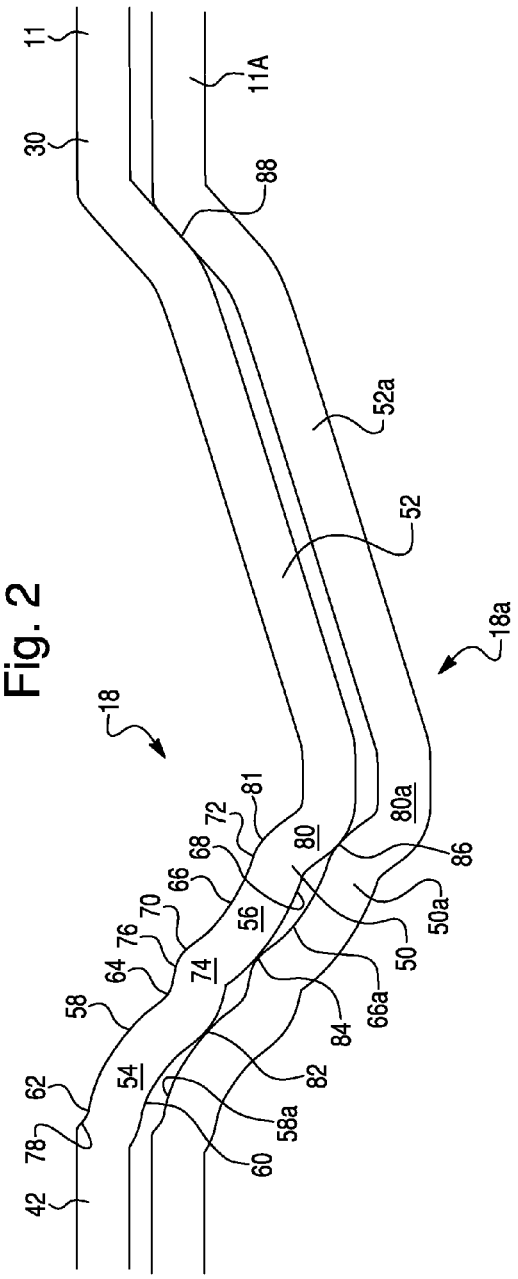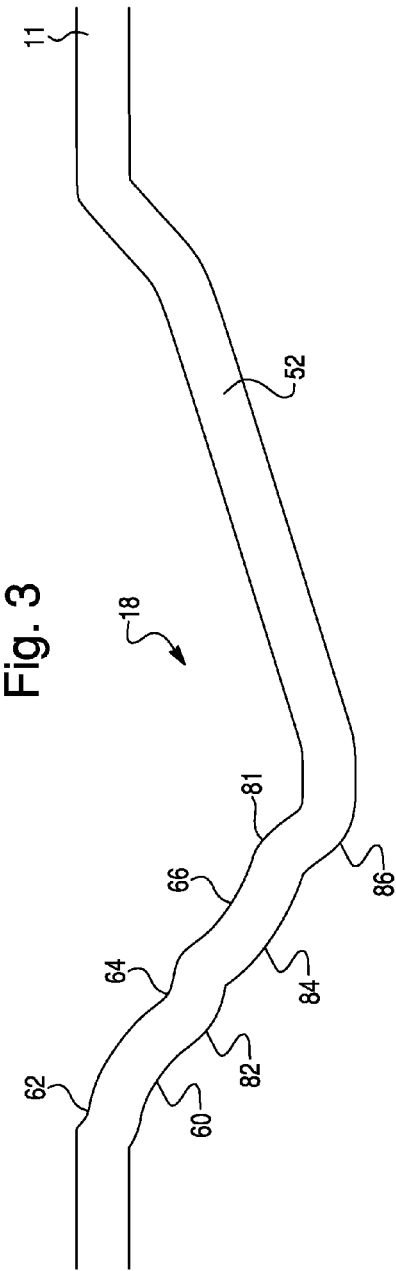

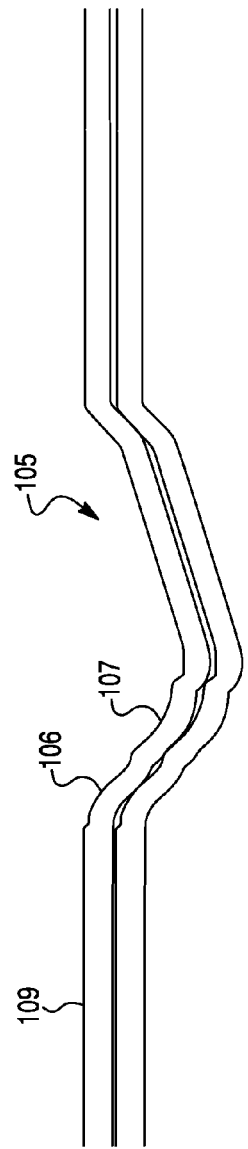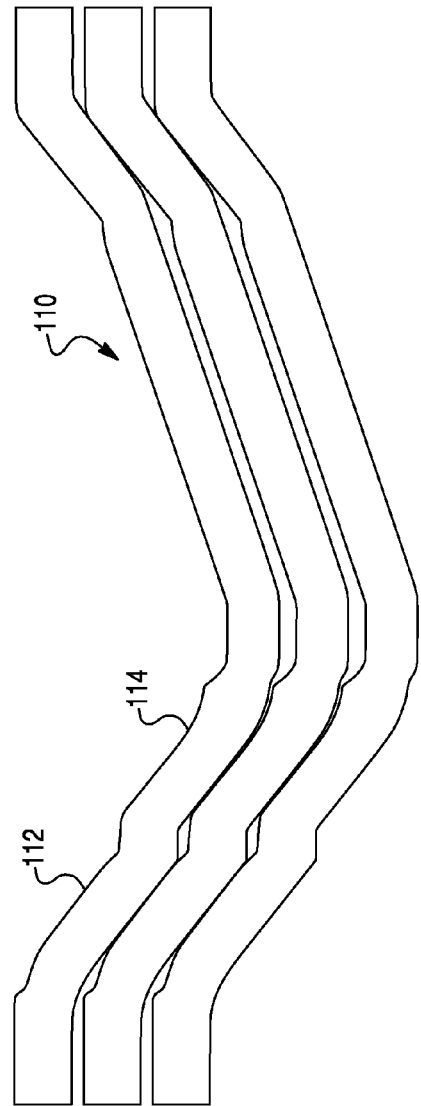

NESTABLE MOLDED ARTICLES, AND RELATED ASSEMBLIES AND METHODS

CROSS REFERENCE TO RELATED APPLICATION AND CLAIM TO PRIORITY

This application is a continuation of application Ser. No. 13/295,180 filed on Nov. 14, 2011, now U.S. Pat. No. 8,283,022 which is a continuation of application Ser. No. 13/029,180, filed on Feb. 17, 2011, now U.S. Pat. No. 8,147,947 which is a divisional of application Ser. No. 12/112,117, filed Apr. 30, 2008, now U.S. Pat. No. 7,897,246, which is based on provisional application Ser. No. 60/924,128, filed May 1, 2007, the disclosures of which are incorporated herein by reference and to which priority is claimed.

FIELD OF THE INVENTION

The present invention relates to man-made molded articles containing bead-and-cove molded depressions, and a method of making the man-made molded articles. More particularly, the man-made molded articles of the present invention provide excellent nesting, one article on another, for shipping and storage of the articles without damage. The present invention also relates to methods of making, using, and shipping the articles, and to assemblies, especially doors, comprising the articles.

BACKGROUND OF THE INVENTION

Man-made boards used in the manufacture of articles such as interior paneling and exterior siding are often made of fiberboard, e.g., hardboard; chipboard; oriented strand board-fiberboard composites; particle board; oriented strand board-particle board composites; and the like. The intended visible major surfaces of these man-made boards are commonly embossed to provide a desired appearance, such as a pattern or grain. Commonly, the fiberboards are molded from a planar cellulosic mat to provide the desired embossment, and are laminated on or otherwise secured to a support structure, such as a frame.

Man-made boards are used in the manufacture of various articles, including doors, and more particularly, in the manufacture of door skins, or door faces, that are secured to opposite major surfaces of a door frame. The man-made door skins often are manufactured to simulate the appearance of expensive natural wood "multi-panel" doors. To accomplish this simulation, the door skins are provided with contoured depressions integrally connecting the simulated panels of the door skin to a major surface portion of the door skin. It is the contoured depressions, and their superior aesthetic qualities in particular, which, when appropriately manufactured, simulate the attractive milled appearance of a natural wood multi-panel door. One type of milled appearance, known as a bead-and-cove profile, is particularly popular.

FIG. 5 depicts in cross section contoured depressions of conventional door skins 100 having identical bead and cove profiles. Bead portion 101 generally refers to a convex portion of the exterior (upper in FIG. 5) surface of the contoured depression, whereas the cove portion 102 is represented by a concave region of the exterior surface of the contoured depression. A ledge 103 separates bead portion 102 and cove portion 102 from one another.

It has been found that the surfaces of the contoured molded depressions of conventional door skins 100 as depicted in FIG. 5 are very difficult to paint uniformly due to density differences generated during molding of the contours, and due to the confinement of the inclined surface areas within the relatively small, molded depressions. It has been found that variations in thickness of the molded article adversely affect paintability, causing the painted article to exhibit a non-uniform coat. Also, the contoured surface of the depression is extremely difficult to provide with embossments representing, for example, a wood grain pattern, because such embossed texture on depression-forming inclined walls has a tendency to cause the article to stick to the mold cavity, causing fibers to pull away from the surface of the molded article when it is removed from the mold cavity.

Articles possessing the profile of FIG. 5 also do not nest well with one another. Rather, adjacent stacked articles are characterized by sizable gaps between the articles, unless localized material removal is performed by post-molding processing. But localized material removal is time consuming and laborious, and generally inconsistent with high throughput production environments. Further, stacking instability can cause damage to the contoured depression profiles of the stacked articles, particularly in the exterior decorative surface areas of the lowermost articles. Damage often is the result of abrasive rubbing between the stacked articles experienced during shipping and handling. Loss of detail to the highly valued appearance of the contoured depressions can ruin the simulation of highly skilled millwork, and devalue the article.

The relatively large gaps between inefficiently stacked skins represent dead or wasted space. As a consequence, the number of articles that can be stably stored or shipped within a given volume of space, e.g., on a pallet or a truck bed, is much less than optimal. The wasted space raises production costs, particularly in relation to storage and pre-assembled palletized shipment of the stacked skins.

FIG. 6 illustrates the profile of another door skin 105. In FIG. 6 the non-uniform thickness is created primarily by the variations in thickness of the contoured area, e.g., bead portion 106 and cove portion 107, relative to horizontal planar wall 109. Bead and cove portions 106, 107 possess small thicknesses than planar wall 109. Because of their reduced thicknesses, bead and cove portions 106, 107 require a thicker paint coat than planar wall 109 to achieve a uniform paint appearance. In order to achieve a uniform, consistent paint appearance between the contoured area and planar wall 109 and simplify painting, the same thickness coat is normally applied to both the contoured area and planar wall 109. As a result, planar wall 109 receives an amount of paint in excess of that required to achieve paint uniformity at planar wall 109, thereby unnecessarily increasing labor and production costs. Further, the amount of paint applied to the entire exterior surface of skin 105 is dictated by the contoured area, e.g., 106 and 107, even though the contoured area constitutes a minority of the overall surface area of the exterior surface of skin 105. Furthermore, the increased thickness of planar wall 109 compared to the contoured area increases material costs and product weight without offsetting benefits.

The above-discussed problems of conventional molded composite articles are largely overcome by U.S. Pat. No. 5,543,234, the assignee of which is also the assignee of this patent application. The '234 patent discloses articles designed for efficient, essentially damage-free shipping and storage, while stacking articles one upon another. The articles include decorative molded walls characterized by depressions possessing convex and concave surface portions having inclined planar surface portions. An example of a depression profile of a skin 110 of the '234 patent is shown in FIG. 7. According to an embodiment of the '234 patent, when the articles are stacked on upon another, inclined planar surface portions 112, 114 establish multiple seating contact zones in the form of continuous planar interfaces between opposing surfaces of stacked articles. The multiple seating zones significantly reduce relative movement and abrasive contact between stacked skins. It is thereby possible to stack the articles, or skins, with stable nesting while preventing side-to-side rocking, surface abrasion, and damage, as otherwise encountered with conventional skins shown in FIG. 5 during long-haul shipping. Stacking of the skins depicted in FIG. 7 also can be achieved with relatively small gaps between the stacked skins, thereby reducing the amount of space required to store and ship skins. Additionally, the skins of FIG. 7 possess a substantially uniform density, and consequently require a low number of coats to achieve paint coating uniformity. Reductions in paint and painting labor time lower production costs.

The inclined planar surface portions of the articles disclosed in U.S. Pat. No. 5,543,234 provide an appearance with unique attributes desired by some consumers. However, other consumers might interpret the appearance of the inclined planar surface portions as manifesting a relatively contemporary architectural style, and therefore lacking of some of the historical millwork detail of a "bead and cove" Colonist design.

Therefore, it is desirous to combine classical design aesthetics and nestable functional elements in bead and cove molding geometries of a molded article having a substantially uniform density.

SUMMARY OF THE INVENTION

A first aspect of the invention provides a man-made, molded article having an exterior surface and an interior surface, and comprising a profile including a planar wall and an adjacent integral molded depression. The depression includes a contoured wall extending downwardly from the planar wall toward a bottom of the depression. The contoured wall comprises a bead portion having opposite bead exterior and interior surface regions, a cove portion having opposite cove exterior and interior surface regions, and a ledge between the bead portion and the cove portion. The molded article is stackable, one above another for transport, with another molded article of identical profile in a nestable relationship in which multiple contact zones are present between the contoured walls of the stacked articles. The contact zones include an arcuately extending contact zone between the bead exterior and interior surface regions. The depression has a substantially uniform thickness varying by no more than about +1 percent to about −11 percent in relation to a thickness of the planar wall.

A second aspect of the invention provides a door comprising a frame, and first and second door skins respectively secured to opposite sides of the frame. At least the first door skin has an exterior surface and an interior surface, and comprises a profile including a planar wall and an adjacent integral molded depression. The depression comprises a contoured wall extending downwardly from the planar wall toward a bottom of the depression. The contoured wall comprises a bead portion having opposite bead exterior and interior surface regions, a cove portion having opposite cove exterior and interior surface regions, and a ledge between the bead portion and the cove portion. The first door skin is stackable, one above another for transport, with an identical door skin of identical profile in a nestable relationship in which multiple contact zones are present between the contoured walls of the stacked door skins. The contact zones include an arcuately extending contact zone between the bead exterior and interior surface regions. The depression has a substantially uniform thickness varying by no more than about +1 percent to about −11 percent in relation to a thickness of the planar wall.

A third aspect of the invention provides a method of making a man-made molded article, comprising molding a structurally sound article. The article has exterior and interior surfaces, and comprises a profile including a planar wall and an adjacent integral molded depression. The depression comprises a contoured wall extending downwardly from the planar wall toward a bottom of the depression. The contoured wall comprises a bead portion having opposite bead exterior and interior surface regions, a cove portion having opposite cove exterior and interior surface regions, and a ledge between the bead portion and the cove portion. The molded article is stackable, one above another for transport, with another article of identical profile in a nestable relationship in which multiple contact zones are present between the contoured walls of the stacked articles. The contact zones include an arcuately extending contact zone between the bead exterior and interior surfaces. The substantially uniform thickness of the depression varies by no more than about +1 percent to about −11 percent in relation to a thickness of the planar wall.

A fourth aspect of the invention provides stacked man-made, molded articles comprising first and second molded articles. The first molded article has a first exterior surface and a first interior surface, and comprises a first profile including a first planar wall and an adjacent integral molded first depression. The first planar wall has a first exterior surface region. The first depression comprises a first contoured wall extending downwardly from the first planar wall toward a first bottom of the first depression. The first contoured wall comprises a first bead portion having opposite first bead exterior and interior surface regions, a first cove portion having opposite first cove exterior and interior surface regions, and a first ledge between the first bead portion and the first cove portion. The first depression has a substantially uniform first thickness varying by no more than about +1 percent to about −11 percent in relation to a thickness of the first planar wall. The second molded article is stacked on the first molded article. The second molded article has a second exterior surface and a second interior surface and comprises a second profile with a second planar wall and an adjacent integral molded second depression. The second planar wall has a second exterior surface region. The second depression comprises a second contoured wall extending downwardly from the second planar wall toward a second bottom of the second depression. The second contoured wall comprises a second bead portion having opposite second bead exterior and interior surface regions, a second cove portion having opposite second cove exterior and interior surface regions, and a second ledge between the second bead portion and the second cove portion. The second depression has a substantially uniform second thickness varying by no more than about +1 percent to about −11 percent in relation to a thickness of the second planar wall. The first exterior surface and the second interior surface share multiple contact zones between the first and second contoured walls, the contact zones including an arcuately extending contact zone between the first bead exterior surface region and the second bead interior surface region.

A fifth aspect of the invention provides a method of stacking man-made, molded articles. The method comprises providing first and second man-made molded articles. The first molded article has a first exterior surface and a first interior surface, and comprises a first profile including a first planar wall and an adjacent integral molded first depression. The first planar wall has a first exterior surface region. The first depression comprises a first contoured wall extending downwardly from the first planar wall toward a first bottom of the first depression. The first contoured wall comprises a first bead portion having opposite first bead exterior and interior surface regions, a first cove portion having opposite first cove exterior and interior surface regions, and a first ledge between the first bead portion and the first cove portion. The first depression has a substantially uniform first thickness varying by no more than about +1 percent to about −11 percent in relation to a thickness of the first planar wall. The second molded article having a second exterior surface and a second interior surface, and comprises a second profile including a second planar wall and an adjacent integral molded second depression, the second planar wall having a second exterior surface region. The second depression comprises a second contoured wall extending downwardly from the second planar wall toward a bottom of the second depression. The second contoured wall comprises a second bead portion having opposite second bead exterior and interior surface regions, a second cove portion having opposite second cove exterior and interior surface regions, and a second ledge between the second bead portion and the second cove portion. The second depression has a substantially uniform second thickness varying by no more than about +1 percent to about −11 percent in relation to a thickness of the second planar wall. The second molded article is stacked on the first molded article so that the first exterior surface and the second interior surface share multiple contact zones between the first and second contoured walls, the contact zones including an arcuately extending contact zone between the first bead exterior surface region and the second bead interior surface region.

Other aspects of the invention will become apparent from the accompanying drawings and the detailed description.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 2 is a partial sectional view of a pair of stacked door skins;

FIG. 3 is a partial sectional view of a door skin;

FIG. 6 is a partial sectional view of multiple stacked door skins according to a commercial skin profile;

FIG. 7 is a partial sectional view of multiple stacked door skins according to another conventional skin profile;

Figure 1:
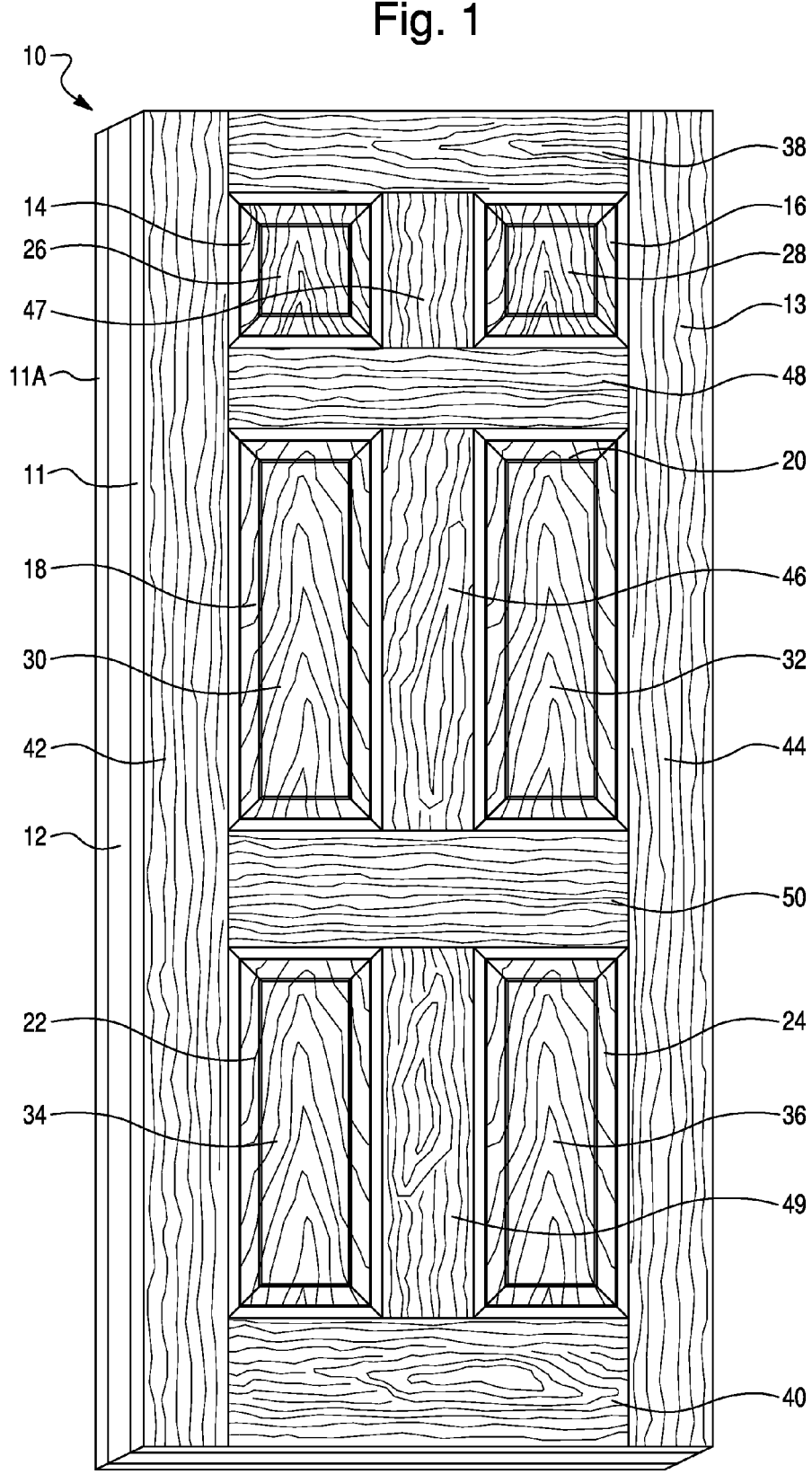
FIG. 1 is a perspective view of a door manufactured to include two laminated door skins defining the major outer surfaces according to an embodiment of the invention.

DETAILED DESCRIPTION OF PREFERRED EMBODIMENTS AND PREFERRED METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In the illustrated embodiments, the man-made, molded articles of the present invention are molded in the form of a multi-panel door, or, more particularly, a thin door skin to be laminated or otherwise adhered to a core, frame or other support substrate, on both major surfaces of the support substrate, to simulate a solid door, preferably with an appearance simulating a natural wood door. Although illustrated as an interior or exterior passage door, it should be understood that the door may be used in other applications, for example, as cabinet, closet, and furniture doors. Further, the opposite door skins may be different or identical, and optionally the door may comprise only one door skin. It should be understood, however, that the principles of the present invention apply to much more than the manufacture of doors or door skins. The present invention may find application to any molded man-made composite wood article that includes one or more depressions having a contoured decorative surface. Examples of other composite, molded wood articles that are capable of being manufactured in accordance with the principles of the present invention include decorative hardboard; interior and exterior siding; decorative interior wall paneling; structural cores; roofing material; crating structures; wainscot; other building and construction materials; and the like.

The articles of the following embodiments are preferably formed of organic cellulosic material, such as cellulosic fibers or cellulosic particles, and a binder capable of adhesively binding the cellulosic material together into a structurally stable article. The organic fibrous material is preferably relatively small particles of wood, e.g., pine, that have passed through a sieve. For example, an 80 mesh sieve may be used, although it should be understood that other sizes both larger and smaller are considered to be well within the scope of the present invention. The present invention, however, is not limited to the use of pine; rather, it is contemplated that various types of wood fiber including but not limited to oak, cherry, maple and combinations of the same or other woods may be used. It is further contemplated that the use of organic fibrous material may contain a blend of wood particles. It is further contemplated that other fibrous organic materials may be used including but not limited to straw, rice husks and knaff. The organic material may contain a mixture of wood and other fibrous organic materials.

The cellulosic fibers, whether in the form of refined, fibrillated fibers, or in the form of discrete particles, can be molded and adhered together with natural or synthetic binders to provide aesthetically pleasing contours and texture in exterior, visible surfaces, including the millwork-simulating depressions surrounding a panel. The binder may be selected from, for example, phenol-formaldehyde resin, urea-formaldehyde resin, and mixtures thereof.

High density fiberboard is particularly useful in various embodiments of the invention, although other materials such as medium density fiberboard may be selected. High density fiberboard contains a cellulosic fiber content of about 80 to about 97 percent by weight, based on dry weight. The binder typically constitutes about 2 to about 15 percent by weight of the dry weight of the article. Additional ingredients may also be included, such as sizing agents.

The articles of the following embodiments can possess very small thicknesses on the order of about 0.09 to about 0.2 inch, although thinner and thicker articles are also contemplated. The articles can be prepared in isolation. Alternatively, the articles can be molded together with an underlying support or core material, such as an oriented strand board, particle board, plywood, wafer board, or a thermoplastic or thermosetting plastic core material by molding the face or skin cellulosic material together with the underlying core material. The following U.S. patents are hereby incorporated by reference as examples of various different cores, having cellulosic fibers or particles as a surface layer, that are suitable for molding in accordance with embodiments of the present invention: Shaner, U.S. Pat. No. 4,361,612; Wentworth U.S. Pat. No. 4,364,984; Greten U.S. Pat. No. 3,098,781; Birmingham U.S. Pat. No. 2,343,740; Bryant U.S. Pat. No. 3,308,013; Elmendort U.S. Pat. No. 2,831,793; Hunt U.S. Pat. No. 4,246,310; and Barnes U.S. Pat. No. 4,610,913. If the thin cellulosic molded article (e.g., door skin) is molded separately, the article may later be laminated or otherwise secured to a support structure.

Turning now to the drawings, and initially to FIG. 1, there is illustrated a door, generally designated by reference numeral 10, including a first door skin 11, and an identical second door skin 11A. Skins 11, 11A are secured, e.g., adhesively and/or with fasteners, to opposite major surfaces of an interior support structure 12, such as a door frame. The outer surfaces of door skins 11, 11A possess aesthetic surface contours in the visible outer surfaces that correspond to contours essentially identical to contours of a mold cavity (not shown).

Door skins 11 and 11A are formed in accordance with molding procedures well known in the art. Although not necessarily by limitation, the procedures usually employ a mold apparatus including upper and lower mold dies. One or both of the mold dies are movable towards and away from the other mold die. In the closed state, opposing surface of the mold dies define a mold cavity. The cavity-defining surface of the one of the mold dies (e.g., upper mold die) is shaped generally complementary or as the inverse of the desired shape of exterior surface 13 of door skin 11. For example, the mold die may include raised mold portions dimensioned and arranged to correspond to depressions (discussed below) in exterior surface 13 of door skin 11. The cavity-defining surface of the other mold die (e.g., lower mold die) has a shape that is generally complementary or the inverse of the desired shape of the interior surface of door skin 11. Examples of molding apparatus and procedures that may be practiced in connection with embodiments disclosed herein are disclosed in U.S. Pat. Nos. 7,096,916, 6,743,318, and 6,579,483, the disclosures of which are incorporated herein by reference.

Two relatively thin door skins 11 and 11A may be molded separately and then secured on opposite major surfaces of support structure 12. Alternatively, support structure 12 can be disposed between two door skins 11 and 11A, in the mold cavity, to consolidate the upper and lower layers that form door skins 11 and 11A under heat and pressure, while simultaneously bonding the door skins to support structure 12, in a single molding step. In this manner, a strong bond between skins 11 and 11A and support structure 12 is formed via resin binder included in cellulosic layers 11 and 11A surrounding support structure 12, so that a separate bonding step for securing door skins 11 and 11A to support structure 12 is not needed. Support structure 12 can be a cellulosic material, e.g., wood or an oriented stand board or fiberboard; a plastic material, e.g., foamed or solid polymer, e.g., thermoplastic or thermosetting polymer; a composite material; or other materials.

The exemplary door skins, e.g., 11, shown in FIG. 1 are molded to simulate a multi-panel door surface. The illustrated embodiment shown in FIG. 1 contains six panels 26, 28, 30, 32, 34, and 36. Panels 26, 28, 30, 32, 34, and 36 preferably lie in a common plane with one another. In the illustrated embodiment, each panel 26, 28, 30, 32, 34, and 36 possesses a rectangular perimeter, and optionally may possess a square perimeter. It should be understood that door skins 11, 11A may contain fewer or more panels than shown, including only a single panel. Further, panels 26, 28, 30, 32, 34, and 36 may possess perimeters other than that of a rectangle, e.g., the perimeters may undertake the shape of other polygons, circles, ellipses, etc.

Surrounding each panel 26, 28, 30, 32, 34 and 36 is a respective molded depression 14, 16, 18, 20, 22 and 24, each of which has a rectangular plan appearance as depicted in FIG. 1. The shapes of depression 14, 16, 18, 20, 22, and 24 and surrounded panels 26, 28, 30, 32, 34, and 36, respectively, preferably conform to one another. Each depression 14, 16, 18, 20, 22 and 24 is completely surrounded by a major or main body portion. The main body portion of skin 11 of FIG. 1 includes horizontal door surface portions 38, 40, 48, and 50, and vertical door portions 42, 44, 46, 47, and 49, shown lying in a common plane, and optionally lying in a common plane with the panels 26, 28, 30, 32, 34, and 36 as well.

Depressions 14, 16, 18, 20, 22, and 24 are molded to establish inclined walls having exterior surfaces that, in accordance with preferred embodiments of the present invention, are of substantially constant density and thickness. The exterior surfaces of depressions 14, 16, 18, 20, 22, and 24 include contours, preferably characterized by a bead-and-cove design. The contours extend downwardly and inwardly from the main body portion of door skin 11 to a lowermost portion or bottom of depressions 14, 16, 18, 20, 22, and 24. Slanted wall portions extend from the bottom of depressions 14, 16, 18, 20, 22, and 24 further inwardly and upwardly to panels 26, 28, 30, 32, 34, and 36, respectively. The cross-sections or profiles of depressions 14, 16, 18, 20, 22, and 24 of various embodiments of the invention are described in more detail below. It should be understood that the cross-sectional profiles of depressions 14, 16, 18, 20, 22, and 24 are preferably identical to one another, but may be different from one another.

As best shown in FIG. 2, door skins 11, 11A are shown disassembled from support structure 12, and stacked one upon the other in a nested relationship. Door skins 11, 11A are identical in profile. Reference numerals are shown in FIG. 2 for door skin 11 only. For the purposes of discussion, corresponding parts and features of door skin 11A will be referred to herein using like reference numerals, with the suffix "a". For example, the depression of door skin 11A (corresponding to depression 18 of door skin 11) will be referred to in this detailed description as depression 18a.

For the purpose of discussion, only the left side leg (with reference to FIG. 1) of depression 18 and its adjoining vertical door portion 42 and panel 30 are illustrated in FIG. 2. The profiles of depression 18 on the top and bottom and opposite right side legs of panel 30 are identical. Similarly, depressions 14, 16, 20, 22, and 24 may be identical to depression 18.

Depression 18 is molded to include a contoured wall 50 extending downwardly from vertical door portion 42 to the bottom of depression 18, and a slanted wall 52 extending from the bottom portion of depression 18 to panel 30. The adjoining vertical door portion 42, contoured wall 50, slanted wall 52, and panel 30 preferably are integrally formed and contiguous with one another as a unitary unit subjected as a unit to a molding procedure.

Contoured wall 50 extends downwardly from planar wall 42 to bottom 80 of depression 18. Contoured wall 50 is characterized by a bead-and-cove configuration, comprising a bead portion 54 and a cove portion 56. Bead portion 54 has a convex exterior surface region 58 and an opposite concave interior surface region 60. Bead exterior surface region 58 extends between a first upper end point 62 and a first lower end point 64. Cove portion 56 has a concave exterior surface region 66 and an opposite convex interior surface region 68. Cove exterior surface region 66 extends between a second upper end point 70 and a second lower end point 72.

Contoured wall 50 further includes a ledge 74 interposed between bead portion 54 and cove portion 56. Ledge 74 has an exterior surface region 76 interposed between first lower end point 64 and second upper end point 70. Exterior surface region 76 of ledge 74 may be parallel, perpendicular, or askew relative to the exterior surface regions of vertical door portion 42 and panel 30. Although exterior surface region 76 of ledge 74 is shown as generally planar, it should be understood that exterior surface region 76 may have other shapes, such as arcuate and stepped. Additionally, contoured wall 50 includes a shoulder 78 interposed between first upper end point 62 and vertical door portion 42. Contoured wall 50 includes an inclined surface region 81, which functions as a contact zone (discussed below).

Multiple seating or contact zones 82, 84, and 86 are established between contoured wall 50 of door skin 11 and contoured wall 50a of skin 11A when skins 11, 11A are adjacently stacked on one another in a nested relationship. Contact zone 82 is a continuous contact region represented by an arcuately extending contact interface/zone between convex bead exterior surface region 58a of skin 11A and concave bead interior surface region 60 of skin 11. Contact zone 84 is depicted as a point contact between cove exterior surface region 66a of skin 11A and cove interior surface region 68 of skin 11, although it should be understood that contact zone 84 may comprise an arcuate or linear extending interface. Contact zone 86 is depicted as a continuous linear contact zone between exterior surface planar region of bottom portion 80a of skin 11A and an interior surface planar region of bottom portion 80 of skin 11. Continuous linear contact zone 86 is formed by respective planar regions of the interior surface region of bottom portion 80 and the exterior surface region of bottom portion 80a. Although shown as a linear interface, contact zone 86 alternatively may possess a convex or concave curvature interface. It should be understood that two, three, four, or more contact zones may be established between contoured wall 50 and contoured wall 50a.

Another contact zone 88 (FIG. 2) between stacked skins 11, 11A is established at the interface of the interior surface region of slanted wall 52 and the exterior surface region of slanted wall 52a. Contact zone 88 is illustrated as a linear contact zone between planar surface regions of slanted walls 52, 52a. It should be understood that contact zone 88 may possess a convex or concave curvature.

The presence of multiple contact zones, e.g., 82, 84, and 86, including one or more arcuate contact zones 82, along contoured walls 50, 50a, together with at least one additional contact zone 88 between slanted walls 52, 52a establishes an excellent nesting capability between adjacent skins 11, 11A. The multiple contact zones, e.g., 82, 84, 86, and 88 cause an interlocking relationship between stacked skins, substantially reducing or eliminating relative movement between skins 11, 11A during transport. Consequently, skins 11, 11A are less susceptible to abrasive rubbing and damaging impact forces during stacking, shipping, and handling.

Certain materials, such as high density fiberboard (HDF), are not very flowable during mold pressing. For example, a HDF material having a specific gravity of about 1.0 will not allow for more than a 15 percent caliper or thickness reduction in comparison to flat zones. As a result, differences in caliper (i.e., the distance between opposing mold faces) practiced during molding result not only in thickness differences, but also in inconsistent and varying densities along the profile of the article, i.e., higher densities corresponding to the smaller calipers. Accordingly, it is desirable to maintain the caliper between opposing mold faces relatively uniform over the depression profile so as to avoid wide variations in molded fiberboard density.

Figure 4:
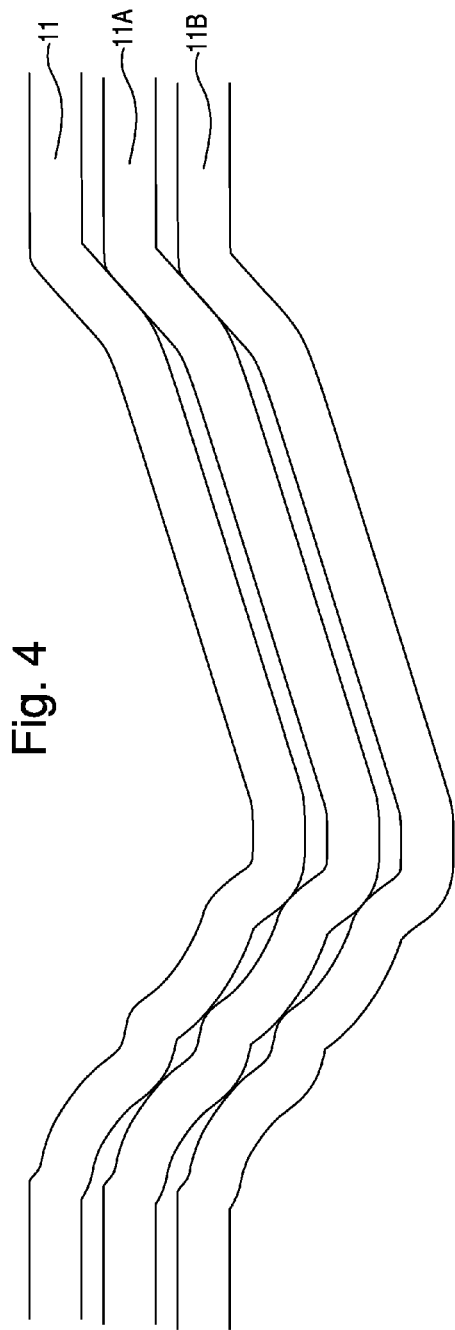
FIG. 4 is a partial sectional view of three of the stacked door skins of FIGS. 2 and 3.
Figure 5:
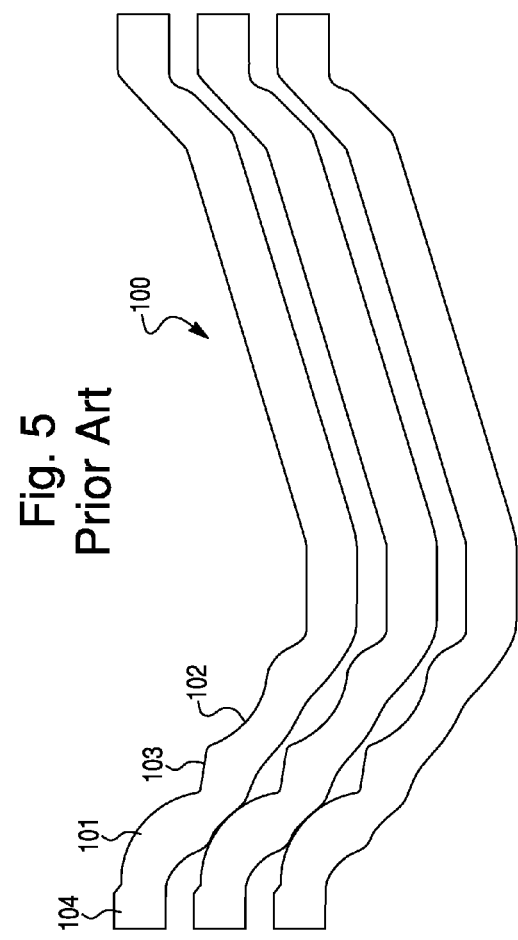
FIG. 5 is a partial sectional view of multiple stacked door skins according to a conventional skin profile.

FIG. 4 illustrates the nesting, one above another, of multiple door skins 11, 11A, 11B having substantially uniform thicknesses that vary by no more than +1 percent to −11 percent in relation to the thickness of planar wall 42.

Minor Clip Arcs

Figure 8:
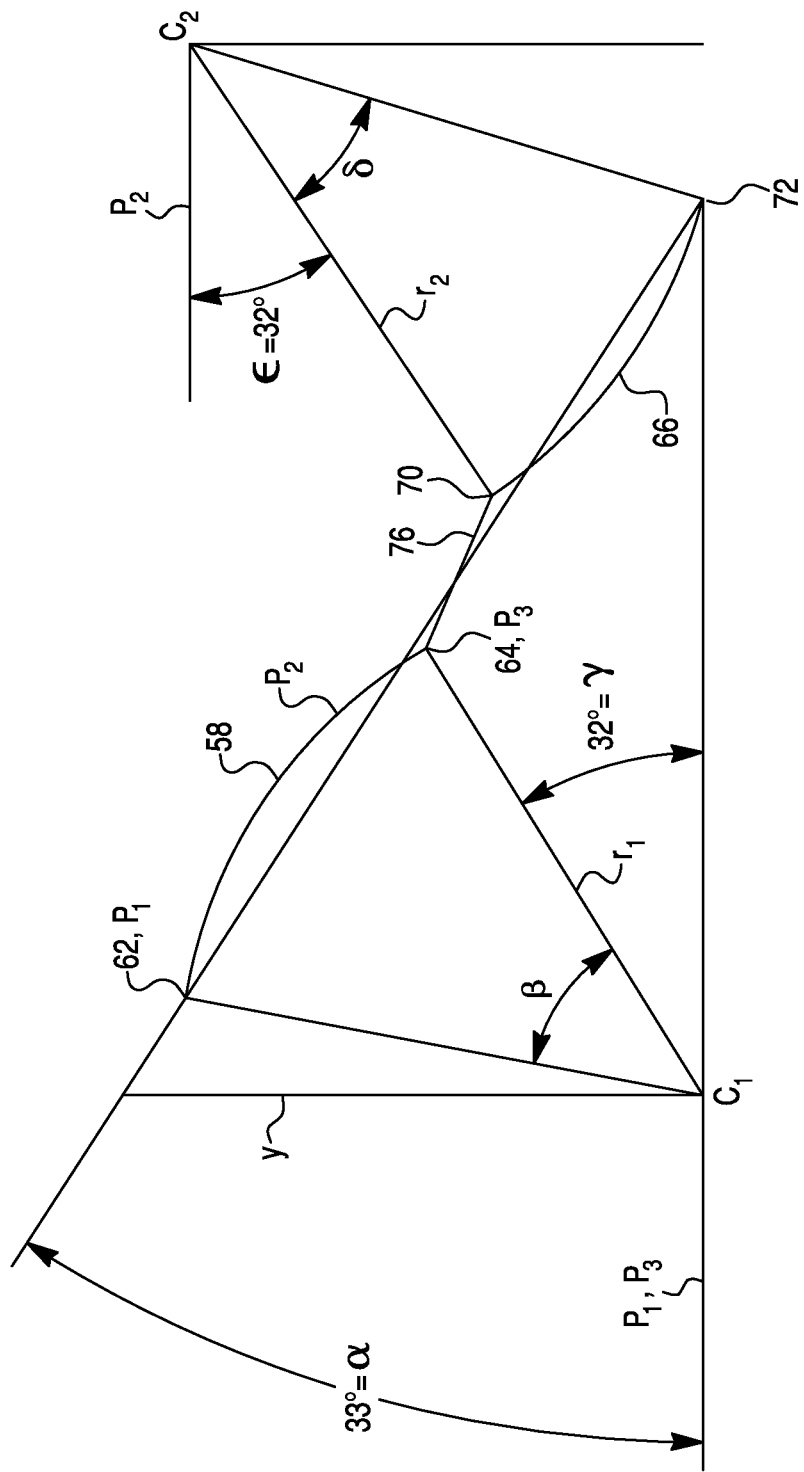
FIGS. 8 and 9 are partial side schematic views of an outline of a contoured wall of a door skin according to an embodiment.

FIG. 8 depicts a continuous outline of exterior surface region 58 of bead portion 54, exterior surface region 76 of ledge 74, and exterior surface region 66 of cove portion 56. Bead exterior surface region 58 and cove exterior surface region 66 are depicted as minor clip arcs. Bead and cove exterior surface regions 58, 66 span less than 90 degrees, and do not extend beyond perpendicular (90 degrees) relative to the plane in which the exterior surface region of planar wall 42 lies. In FIG. 8, perpendicular is represented by line y. Arcs extending beyond perpendicular line y are referred to herein as major clip arc, discussed below.

Contoured wall 50 has an angle of inclination α (alpha) measured between, on the one hand, an imaginary line connecting distal ends (i.e., first upper end point 62 and second lower end point 72) of bead exterior surface region 58 and cove exterior surface 66 region, relative to, on the other hand, a plane parallel to the exterior surface region of planar wall 42 and extending through second lower end point 72. The angle of inclination α for minor clip arc bead and cove portions 54, 56 preferably is in the range of about 20 degrees to about 34 degrees, optionally within a range of about 28 degrees to about 33 degrees, to provide preferred aesthetic features to the bead-and-cove design while permitting compact stacking. In FIG. 8, the inclination angle α equals 33 degrees. An angle of inclination that is less than about 20 degrees does not cast sufficiently defining highlight shadows capable of accurately simulating real millwork detail, and thereby may not fully emphasize the desired bead-and-cove appearance from afar. On the other hand, an angle of inclination exceeding about 34 degrees adversely impacts the thickness uniformity of the articles for controlling density. The lack of thickness and density uniformity deleteriously affects the consistency and uniformity of a paint coating applied to the article. As a consequence, an article may require extra paint coats or special paint to achieve a uniform appearance. Further, high thickness and density variability may increase the weight and overall thickness of the articles. Angles of inclination exceeding about 34 degrees also may adversely affect nestability between stacked articles. Poor nesting increases space requirements for storing and transporting skins 11, 11A, thereby raising production costs.

Bead exterior surface region 58 is non-variable (fixed) in its convex curvature. That is, if exterior surface region 58 were continued along the same arcuate path beyond first upper end point 62 and first lower end point 64, the resulting curved line would form an imaginary first continuous circle having an imaginary first center $C_1$ of uniform radial distance to any point on the exterior surface region 58. The angle $\beta$ (beta) subtending the minor clip arc, i.e., the length of exterior surface region 58 extending between first upper end point 62 and first lower end point 64, is preferably in a range of about 39 degrees to about 59 degrees. Angles less than about 39 degrees do not fully express the curvature of the bead, and may be mistaken as a planar segment. On the other hand, a span of greater than about 59 degrees for the minor clip arc negates compliance with a minimum offset angle of 32 degrees, discussed below. In FIG. 8, subtending angle $\beta$ equals 40 degrees.

In order to determine the subtending angle $\beta$, it is helpful to treat exterior surface regions 58 and 66 as segments of respective imaginary first and second circles. Center $C_1$ of an imaginary first circle can be determined by taking any three points $P_1$, $P_2$, and $P_3$ on bead exterior surface region 58 using known techniques. For example, two lines can be formed through two pairs of the points. A first line "a" passes through points $P_1$ and $P_2$. A second line "b" passes through points $P_2$ and $P_3$. Center $C_1$ of the imaginary first circle is the intersection of two lines perpendicular to and passing through the midpoints of the lines $P_1P_2$ and $P_2P_3$. Equations for mathematically ascertaining centers $C_1$ and $C_2$ are also well known.

Likewise, subtending angle $\delta$ (delta) of cove exterior surface region 66 is determined by treating the concave surface of cove exterior surface region 66 as non-variable (fixed). If exterior surface region 66 were continued along the same arcuate path beyond second upper end point 70 and second lower end point 72, the imaginary line would continue 360 degrees to form an imaginary second circle having an imaginary second center $C_2$ of uniform radial distance to any point on cove exterior surface region 66. The angle $\delta$ (delta) subtending the minor clip arc, i.e., exterior surface region 66, is preferably in a range of about 39 degrees to about 59 degrees. Angles less than about 39 degrees do not fully express the curvature of the cove, and may be mistaken as a planar segment. On the other had, a span of greater than about 59 degrees for the minor clip arc negates compliance with a minimum offset angle of 32 degrees, discussed below. In the embodiment depicted in FIG. 8, angle $\delta$ is equal to 40 degrees.

Another preferred feature for improving the nestability of stacked skins is to characterize bead exterior surface region 58 minor clip arc with an offset angle $\gamma$ (gamma) in a range of about 32 degrees to about 50 degrees. Offset angle $\gamma$ is measured between an imaginary first radial line $r_1$ connecting imaginary first center $C_1$ to first lower end point 64, and a plane $p_1$ parallel to planar wall 42 extending through imaginary first center $C_1$. ($p_1$ and $p_3$ optionally but not necessarily may be collinear, as in FIGS. 8 and 9.) Cove exterior surface region 66 preferably also is characterized by an offset angle $\epsilon$ (epsilon) in a range of about 32 degrees to about 50 degrees. Offset angle $\epsilon$ is measured between an imaginary second radial line $r_2$ connecting imaginary center $C_2$ to second upper end point 70, and a plane $p_2$ parallel to planar wall 42 extending through imaginary second center $C_2$. In FIG. 8, $\gamma$ (gamma) and $\epsilon$ (epsilon) are equal to 32 degrees and 34 degrees, respectively. Reducing either of offset angle $\gamma$ (gamma) or angle $\epsilon$ (epsilon) below 32 degrees adversely affects the nestability of the substantially uniform thickness skins. Nestability of skins having offset angles less than about 32 degrees can be improved by varying the thickness of the skins, such as by post-molding material removal, to reduce nesting gaps. However, added steps such as post-molding material removal increase labor costs and time.

Figure 9:
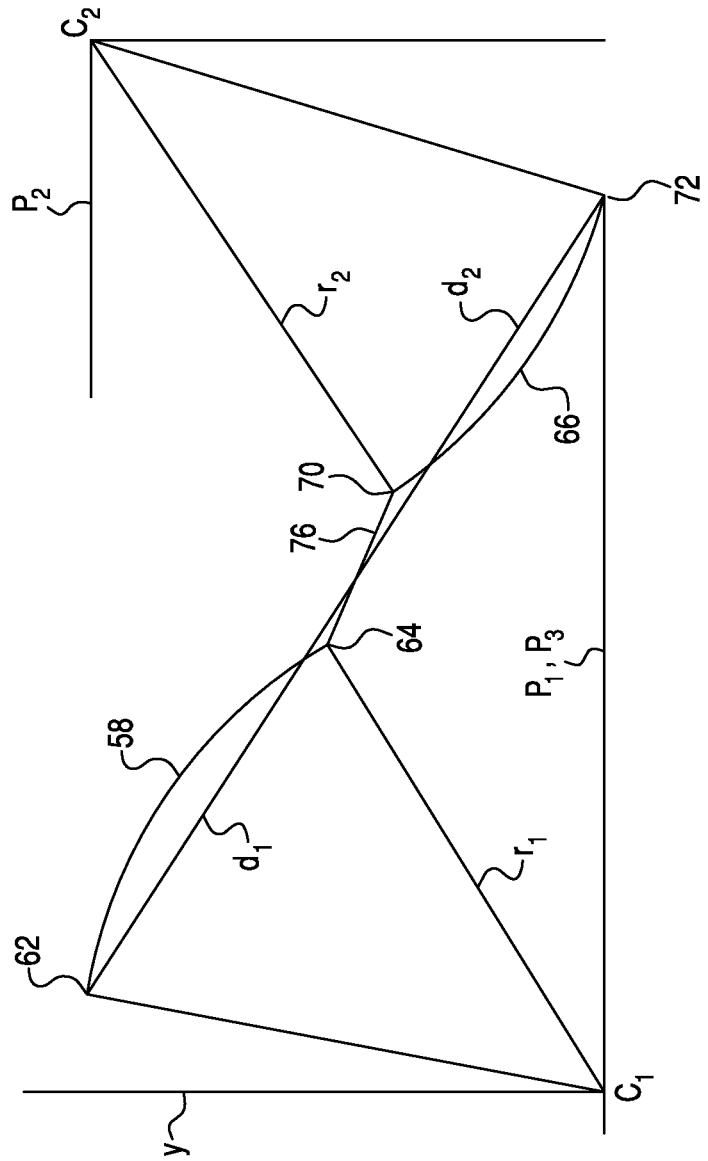

Referring to FIG. 9, another preferred feature relating to bead exterior surface region 58 minor clip arc is that it be characterized by a ratio of the length of a first chord $d_1$ (extending between first upper end point 62 and a first lower end point 64) over the length of imaginary first radial line $r_1$ (connecting imaginary first center $C_1$ to first lower end point 64) in a range of about 0.68 to about 0.95, preferably about 0.8. Similarly, cove exterior surface region 66 minor clip arc is preferably characterized by a ratio of the length of a second chord $d_2$ (extending between second upper end point 70 and second lower end point 72) over imaginary second radial line $r_2$ (connecting imaginary second center $C_2$ to second upper point 70) in a range of about 0.68 to about 0.95, e.g., about 0.8. Minor clip arcs having a ratio of greater than about 0.95 lose their intended functionality, displaying undesirable characteristics such as blisters, brittleness, and cracking. On the other hand, if the ratio is less than about 0.68, the bead or cove loses its visual appearance of an arcuate surface, appearing more as an inclined plane.

Figure 10:
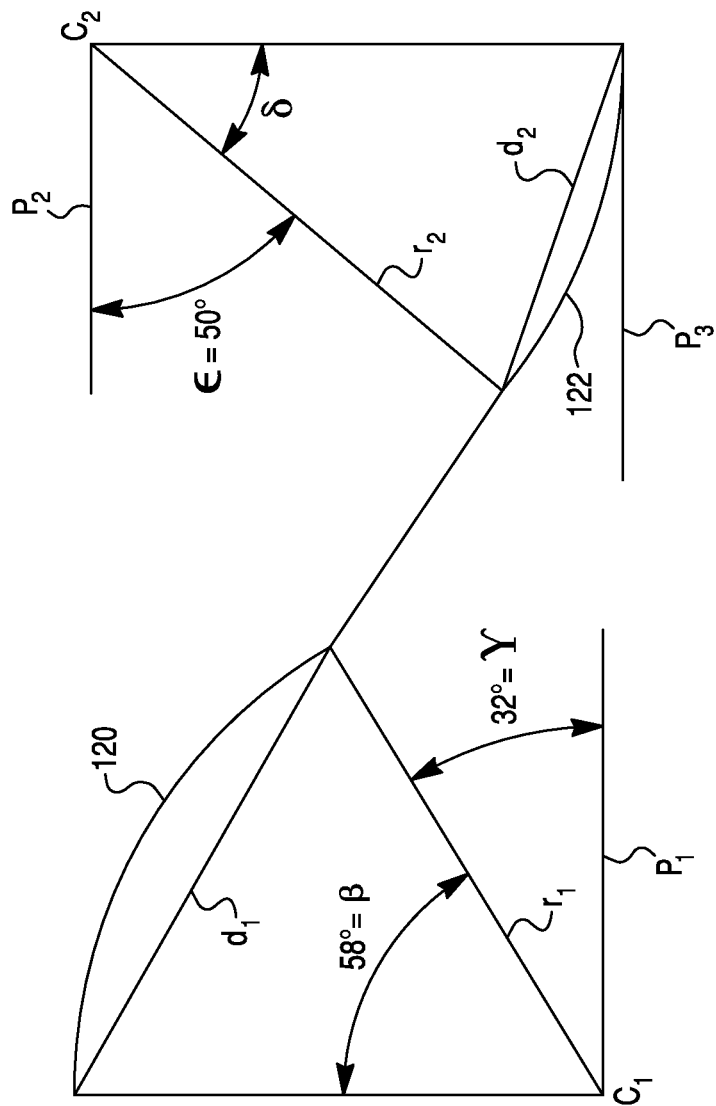
FIG. 10 is a partial side schematic view of an outline of a contoured wall of a door skin according to another embodiment.

FIG. 10 is another embodiment in which subtending angle $\beta$ of bead exterior surface region 120 is set at 58 degrees, offset angle $\gamma$ of the bead portion is set at 32 degrees, subtending angle $\delta$ of cove exterior surface region 122 is set at 40 degrees, and offset angle $\epsilon$ of the cove portion is set at 50 degrees. Unlike the embodiment of FIGS. 8 and 9, planes $p_1$ and $p_3$ are not collinear.

Deviating from the above preferred ranges can result in a loss or reduction in uniformity, stackability, and/or intended functionality of articles 11, 11A. Generally, when the above preferred ranges are adhered to, highly stackable articles with desirable substantially uniform thicknesses can also be obtained. In the case of an interior or exterior door article, standard doors are usually 1 inch, 1⅜ inch, or 1¾ inch. Assuming a minimum dimension of approximately ¼ inch spacing between skins 11, 11A, the profile depth of articles preferably will range from about ¼ inch to about ¾ inch for door skins 11, 11A.

Figure 11:
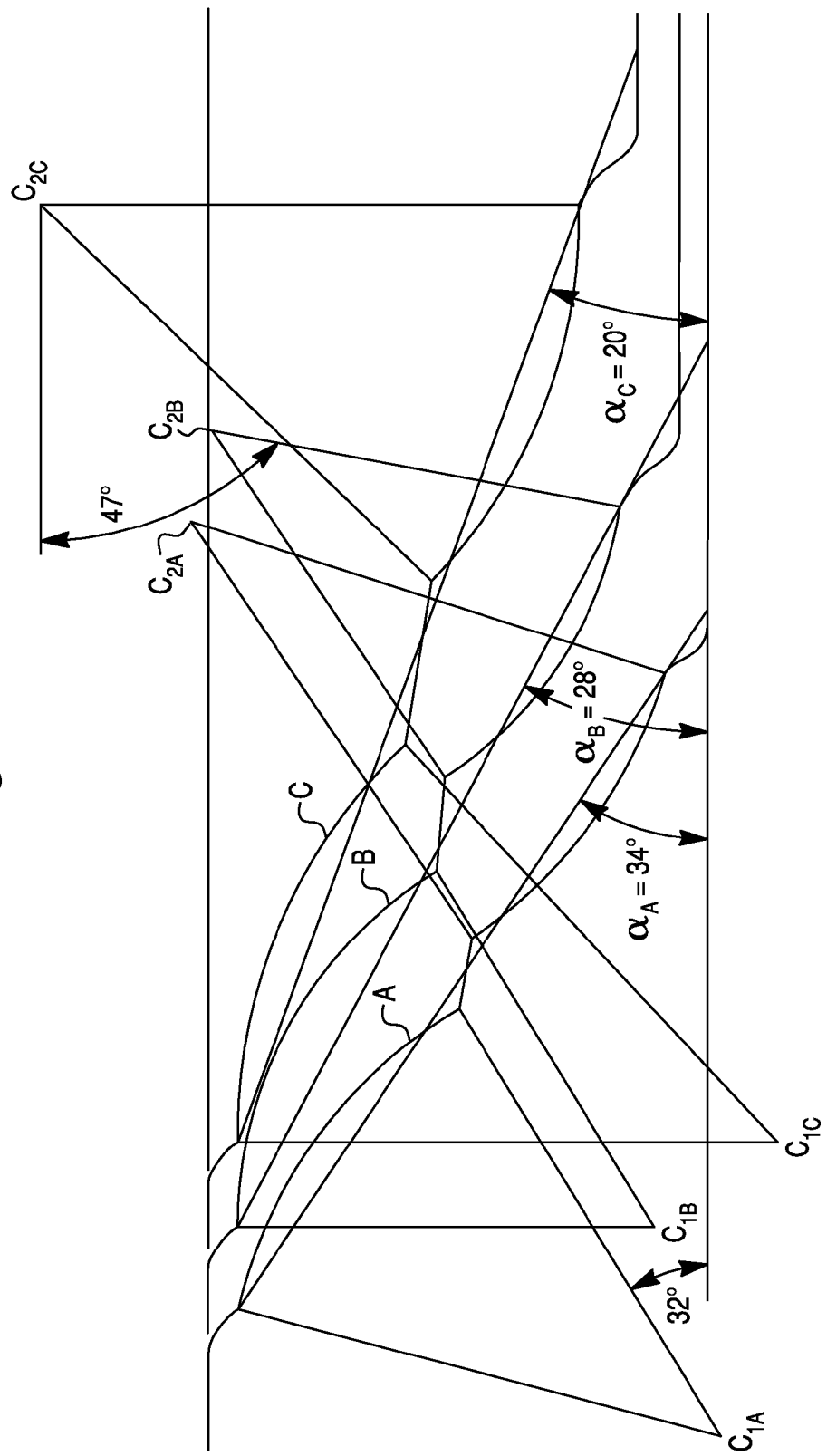
FIG. 11 is a partial side schematic view of an outline of a contoured wall of a door skin at varying angles of inclination.

FIG. 11 illustrates the influence of inclination angle on profile depth, and more particularly how incremental increases in inclination angle $\alpha$ increase the depth of the depression. The exterior surface profiles of three contoured walls A, 13, and C having similar bead-and-cove designs are represented in FIG. 11. From the left to right in FIG. 11, the three exterior surface profiles of contoured walls A, B, and C have angles of inclination $\alpha_A$ of 34 degrees, $\alpha_B$ of 28 degrees, and $\alpha_C$ of 20 degrees, respectively. The depth of surface profiles A, B, and C increases with increasing inclination angle $\alpha$. Selecting an inclination angle $\alpha$ of less than 20 degrees creates a shallow depth, creating a flattened appearance that deemphasizes the curvature of the bead-and-cove profile. Selecting an inclination angle $\alpha$ of greater than 34 degrees creates a large depth that adversely affects paintability and uniformity of the article. Preferably yet optionally, the depth of door skin 11 articles according to embodiments of the invention is in a range of 5/16 inch to ⅞ inch. FIG. 11 also displays imaginary first centers $C_{1A}$, $C_{1B}$, and $C_{1C}$ and imaginary second centers $C_{2A}$, $C_{2B}$, and $C_{2C}$ of surface profiles A, B, and C, respectively.

Major Clip Arcs

Figure 12:
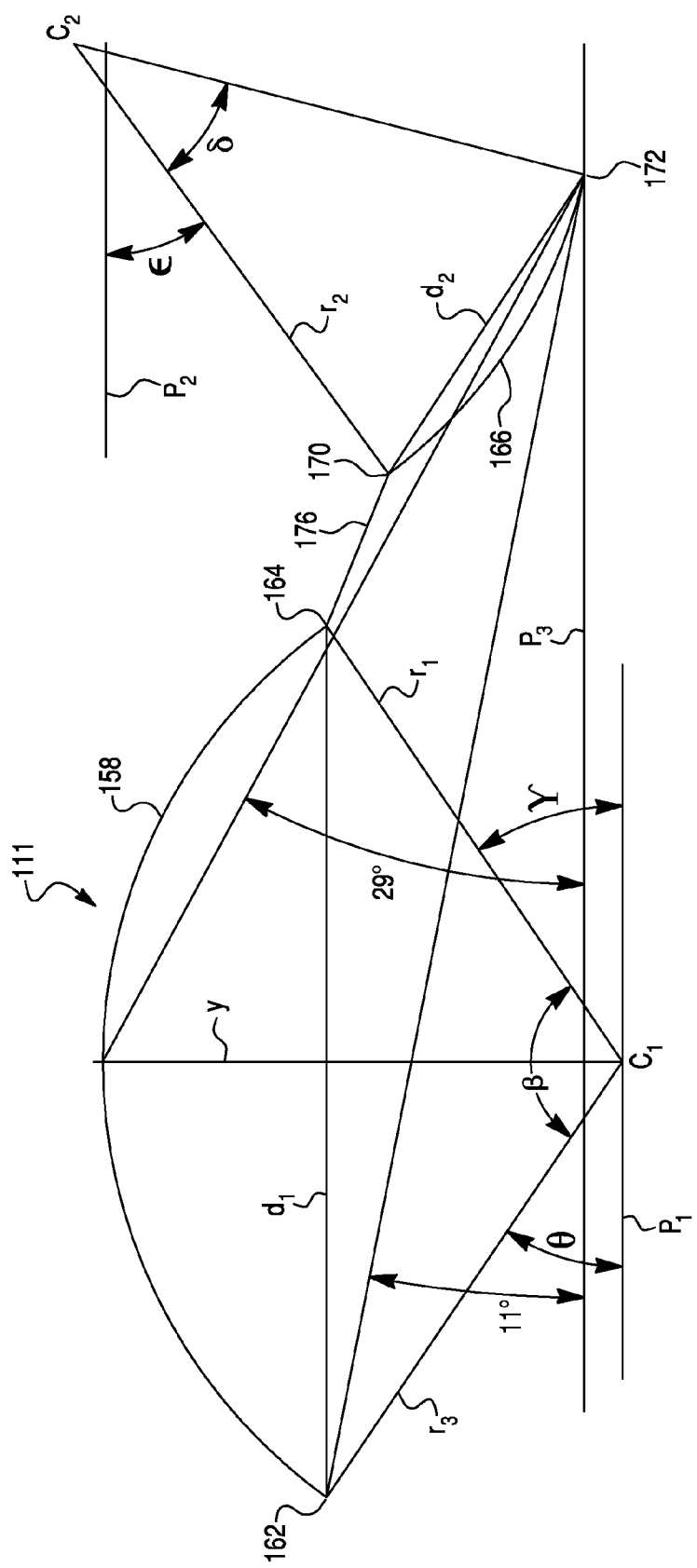
FIG. 12 is a partial side schematic view of an outline of a contoured wall of a door skin according to another embodiment.

FIG. 12 illustrates an embodiment in which an article, skin 111, includes a bead exterior surface region 158 molded as a major clip arc extending beyond perpendicular relative to the plane in which the exterior surface of planar wall 42 lies. In FIG. 12, perpendicular is represented by line y.

The angle of inclination α (alpha), as measured by an imaginary line connecting distal ends (i.e., first end point 162 and second lower end point 172) of the, relative to an imaginary plane $p_3$ parallel to the exterior surface of planar wall 42 extending through second lower end point 172) is preferably about 34 degrees or less. An angle of inclination exceeding about 34 degrees adversely impacts the thickness uniformity of the articles for controlling density. The lack of substantially uniform thickness and density reduces paint coat consistency and uniformity, and may require extra paint coats or special paint to achieve a uniform appearance. Further, high thickness and density variability may increase the weight and overall thickness of the articles. Angles of inclination exceeding about 34 degrees also reduce the nestability of stacked articles. Poor nesting increases space requirements for storing and transporting skins, thereby raising production costs.

It is also preferred that the offset angles γ (gamma) and θ (theta) are each in a range of about 32 degrees to about 50 degrees. Offset angles γ and θ may be the same or different from one another. Offset angle γ, as defined above, is measured between, on the one hand, an imaginary first radial line $r_1$ connecting imaginary first center $C_1$ to end point 164, and, on the other hand, a plane $p_1$ parallel to planar wall 42 extending through imaginary first center $C_1$. Offset angle θ is measured between on the one hand, an imaginary third radial line $r_3$ connecting imaginary first center $C_1$ to end point 162, and, on the other hand, the plane $p_1$. It should be understood that because bead exterior surface 158 constitutes a non-variable clip arc, the distances of $r_1$ and $r_3$ are equal to one another. Offset angle of less than about 32 degrees impair the nestability of skins having uniform thicknesses.

In the event that offset angles γ (gamma) and θ (theta) are each selected at the high end of the range, i.e., about 50 degrees each, the major clip arc defined by angle β is equal to about 80 degrees. On the other hand, in the event that offset angles γ (gamma) and θ (theta) are each selected at the low end of the range, i.e., about 32 degrees each, angle β of the major clip arc is equal to about 116 degrees. Angle β may be any angle between about 80 degrees and about 116 degrees.

Another preferred feature relating to bead exterior surface 158 constituting major clip arc, e.g., FIG. 12, is that it be characterized by a ratio of the length of a first chord $d_1$ (between first end points 162 and 164) over the length of imaginary first radial line $r_1$, i.e., $d_1/r_1$, in a range of about 0.95 to about 1.686. Major clip arcs having a ratio of greater than about 1.686 lose their intended functionality, displaying undesirable characteristics such as blisters, brittleness, and cracking.

FIG. 12 also illustrates ledge exterior surface region 176 and cove exterior surface 166 region of skin 11. Cove exterior surface region 166 preferably satisfies the ranges described above. Specifically, cove exterior surface region 166 is preferably characterized by a subtending angle δ (delta) in a range of about 39 degrees to about 59 degrees, and an offset angle ε (epsilon) in a range of about 32 degrees to about 50 degrees, wherein offset angle ε is measured between an imaginary second radial line $r_2$ connecting imaginary center $C_2$ to second upper end point 170, and a plane $p_2$ parallel to planar wall 42 extending through imaginary second center $C_2$. Cove exterior surface region 166 is also preferably characterized by a ratio of the length of a second chord $d_2$ (extending between second upper end point 170 and second lower end point 172) over imaginary second radial line $r_2$ (connecting imaginary second center $C_2$ to second upper point 170), i.e., $d_2/r_2$ in a range of about 0.68 to about 0.95, preferably about 0.8. The depth of the exterior surface profile of FIG. 12 is 0.3125 inch. Minor clip arcs having a ratio $d_2/r_2$ of greater than about 0.95 lose their intended functionality of maintaining defined substantially uniform caliper thickness, displaying undesirable characteristics such as blisters, brittleness, and cracking, and forcing a larger nesting gap between stacked skins. On the other hand, if the ratio $d_2/r_2$ is less than about 0.68, the cove loses its visual appearance of an arcuate surface, appearing more as an inclined plane.

Variable Arcs

Figure 13:
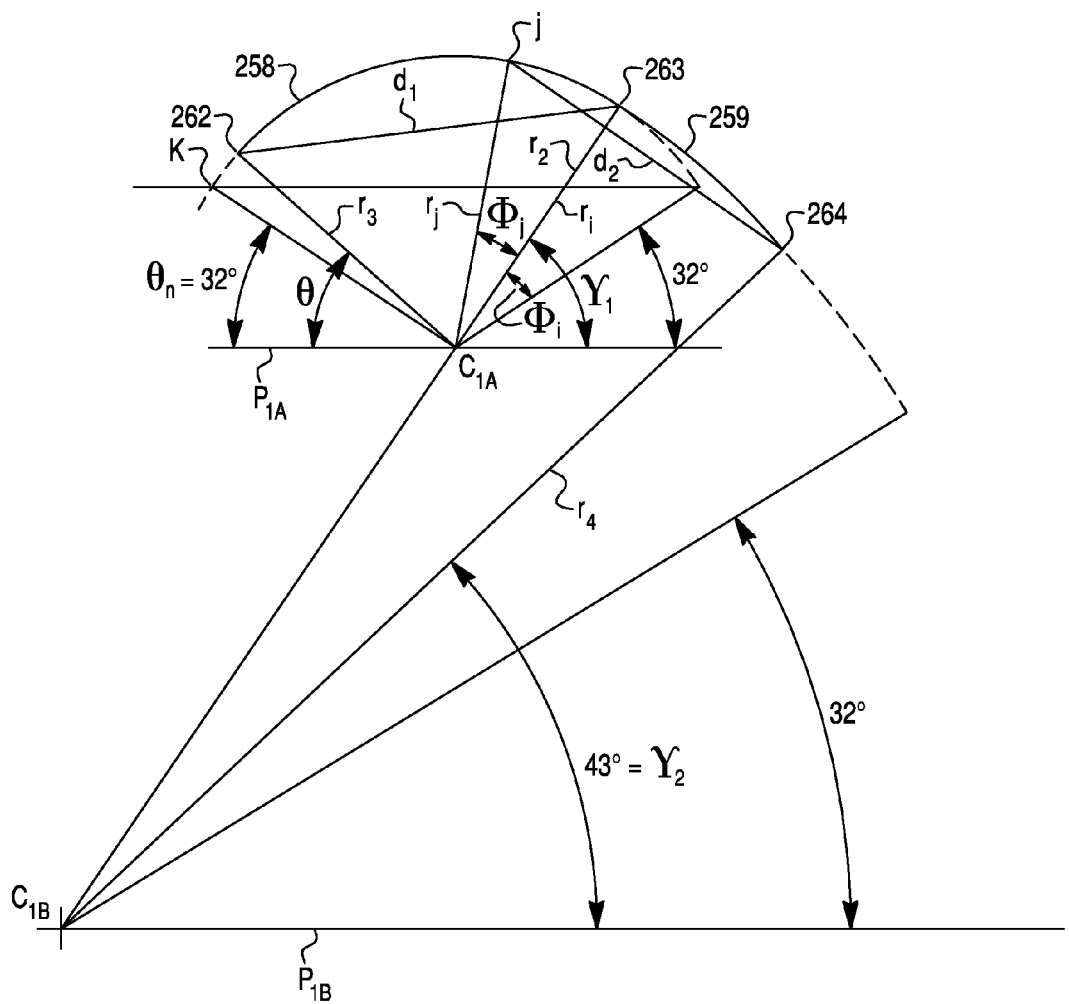
FIG. 13 is a partial side schematic view of an outline of a bead portion of a contoured wall of a door skin according to another embodiment.

FIG. 13 illustrates an embodiment of a door skin 11 having a bead portion with a variable major arc, that is, the curvature of the bead portion is not constant. The variable major clip arc of FIG. 13 is composed of multiple non-variable arcs, i.e., a non-variable (fixed) first convex exterior surface region 258 extending between points 262 and 263, and a non-variable (fixed) second convex exterior surface region 259 extending between points 263 and 264. The first and second convex exterior surface regions 258, 259 share a common tangent point 263.

First convex exterior surface region 258 is non-variable. If surface region 258 were extended along a constant arcuate path beyond points 262 and 263, the resulting curved line would form an imaginary first continuous circle having an imaginary first center $C_{1A}$ of uniform radial distance to any point on the exterior surface region 258. Similarly, if non-variable second convex exterior surface region 259 were extended along a constant arcuate path beyond points 263 and 264, the resulting curved line would form an imaginary second continuous circle having an imaginary second center $C_{1B}$ of uniform radial distance to any point on the exterior surface region 259.

First convex exterior surface region 258 constitutes a major clip arc. As explained above, major clip arc preferably possesses offset angles $\gamma_1$ (gamma) and θ (theta) in a range of about 32 degrees to about 50 degrees. Offset angles γ and θ may be the same or different from one another. Offset angle γ, as defined above, is measured between, on the one hand, an imaginary first radial line $r_1$ connecting imaginary first center $C_1$ to end point 263, and, on the other hand, a plane $p_{1A}$ parallel to planar wall 42 extending through imaginary first center $C_{1A}$. Offset angle θ is measured between on the one hand, an imaginary third radial line $r_3$ connecting imaginary first center $C_{1A}$ to end point 262, and, on the other hand, the plane $p_{1A}$. Point k represents the location where end point 262 would be if the angle $\theta=\theta_k=32$ degrees. Reducing offset angles θ or γ below 32 degrees is undesirable, inasmuch as the reduced offset angles impair the ability to stack identical skins one upon another with small gaps.

Another preferred feature relating to first convex exterior surface region 258 constituting major clip arc is that it be characterized by a ratio of the length of a first chord $d_1$ (between end points 262 and 263) over the length of imaginary radial line $r_3$ in a range of about 0.95 to about 1.686. Major clip arcs having a ratio of greater than about 1.686 lose their intended functionality, displaying undesirable characteristics such as blisters, brittleness, and cracking.

The maximum length of non-variable second convex exterior surface region 259 is determined as follows. An imaginary radius $r_i$ set at an offset angle of 32 degrees from plane $p_{1A}$ is drawn extending from center $C_{1A}$. Next, first convex exterior surface region 258 is extended beyond point 263 until intersecting with imaginary radius $r_1$. This extension beyond point 263 is represented in FIG. 13 by a dashed arcuate line above the reference character $d_2$. The point of intersection of the extended surface region 258 and radius $r_i$ is designated "i."

The angle between $r_2$ and $r_i$ is designated $\phi_i$. An angle $\phi_j$ equal to $\phi_i$ but on the opposite side of $r_2$ is measured, and an imaginary radius $r_j$ is set at $\phi_j$. Imaginary radius $r_j$ intersects with first convex exterior surface region 258 at point j. A second chord $d_2$ is extended from point j through point i, and extrapolated until intersecting the imaginary circle in which second convex exterior surface region 259 lies. This point of intersection 264 represents the farthest extent (or maximum length) that second convex exterior surface region 259 may be extended. In FIG. 13, the minimum offset angle $\gamma_2$ between $r_4$ (connecting $C_{1B}$ and $p_{1B}$) is 43 degrees. This minimum offset angle $\gamma_2$ is greater than the minimum offset angle of 32 degrees typically allowed for a minor clip arc.

Articles embodied herein may provide various benefits. The nestability of the articles in close relationship to one another, i.e., with small interceding gaps, allows the pre-assembled articles to be shipped and stored in larger quantities in a given space. Further, the presence of multiple contact points, including one or more extensive contact zones, reduces movement and resulting abrasive contact between adjacent articles. The highly stabilized nested articles are therefore less likely to experience damage during stacking, shipping, and handling. Additionally, providing the articles with a substantially uniform thickness reduces painting requirements and labor required to establish a uniform coating on the articles. The substantially uniform thickness of the articles also improves the intended functionality of the articles, such as reduced blistering and cracking.

The foregoing detailed description of the certain preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A door skin comprising:
    a door portion;
    a door panel; and
    a depression disposed between the door portion and the door panel, the depression comprising a contoured wall extending downwardly from the door portion toward a bottom of the depression at an angle of inclination and a slanted wall extending upwardly from the bottom of the depression to the panel, the contoured wall comprising a bead portion having opposite bead exterior and interior surface regions, a cove portion having opposite cove exterior and interior surface regions, and a ledge between the bead portion and the cove portion,
    wherein the door skin is stackable for transportation on a second door skin of identical profile in a nestable relationship in which multiple contact zones are present between the contoured walls of the stacked door skins, the contact zones including an arcuately extending contact zone between the bead exterior surface region of the door skin and the bead interior surface region of the second door skin.

2. The door skin of claim 1, wherein the angle of inclination is in the range of about 20 degrees to about 34 degrees.

3. The door skin of claim 1, wherein the depression comprises a profile depth in a range of 0.3125 inches to 0.875 inches.

4. The door skin of claim 1, wherein the slanted wall comprises a linear contact zone.

5. The door skin of claim 1, wherein the depression has a thickness varying by no more than +1 percent to −11 percent in relation to the thickness of the door portion.

6. The door skin of claim 1, wherein the door skin comprises a cellulosic material.

7. The door skin of claim 1, wherein the bead portion extends from an upper end point to a lower end point and has a length in the range of about 39 degrees to about 59 degrees.

8. The door skin of claim 7, wherein the cove portion extends from a second upper end point to a second lower end point and has a length in the range of about 39 degrees to about 59 degrees.

9. The door skin of claim 7, wherein the bead portion has an offset angle in a range of about 32 degrees to about 50 degrees.

10. The door skin of claim 8, wherein the cove portion has an offset angle in a range of about 32 degrees to about 50 degrees.

11. A door comprising:
    a frame; and
    a first door skin and a second door skin attached to the frame, the first and second door skins each comprising a door portion, a door panel, and a depression disposed between the door portion and the door panel, the depression comprising a contoured wall extending downwardly from the door portion toward a bottom of the depression at an angle of inclination and a slanted wall extending upwardly from the bottom of the depression to the panel, the contoured wall comprising a bead portion having opposite bead exterior and interior surface regions, a cove portion having opposite cove exterior and interior surface regions, and a ledge between the bead portion and the cove portion,
    wherein the first and second door skins are stackable for transportation on one another in a nestable relationship in which multiple contact zones are present between the contoured walls of the stacked first and second door skins, the contact zones including an arcuately extending contact zone between the bead exterior surface region of the first door skin and the bead interior surface region of the second door skin.

12. The door skin of claim 11, wherein the angle of inclination is in the range of about 20 degrees to about 34 degrees.

13. The door skin of claim 11, wherein the angle of inclination is in the range of about 28 degrees to about 33 degrees.

14. The door of claim 11, wherein the slanted wall comprises a linear contact zone.

15. The door of claim 11, wherein the depression has a thickness varying by no more than +1 percent to −11 percent in relation to the thickness of the door portion.

16. A door skin comprising:
    a door portion;
    a door panel; and
    a depression disposed between the door portion and the door panel, the depression comprising a contoured wall extending downwardly from the door portion toward a bottom of the depression at an angle of inclination and a slanted wall extending upwardly from the bottom of the depression to the panel, the contoured wall comprising a bead portion having opposite bead exterior and interior surface regions, the bead portion extending from a first upper end point to a first lower end point having a length in the range of about 39 degrees to about 59 degrees, a cove portion having opposite cove exterior and interior surface regions, the cove portion extending from a second upper end point to a second lower end point and having a length in the range of about 39 degrees to about 59 degrees, and a ledge between the bead portion and the cove portion, wherein the door skin is stackable for transportation on another door skin of identical profile in a nestable relationship.

17. The door skin of claim 16, wherein the bead portion has an offset angle in a range of about 32 degrees to about 50 degrees.

18. The door skin of claim 16, wherein the cove portion has an offset angle in a range of about 32 degrees to about 50 degrees.

19. The door skin of claim 16, wherein the angle of inclination is in the range of about 20 degrees to about 34 degrees.

20. The door of claim 16, wherein the depression has a thickness varying by no more than +1 percent to −11 percent in relation to the thickness of the door portion.

* * * * *